US012677835B2

(12) United States Patent
Maas et al.

(10) Patent No.: US 12,677,835 B2
(45) Date of Patent: Jul. 14, 2026

(54) STABLE CHLORINATED ALKALINE PRODUCTS

(71) Applicant: ECOLAB USA INC., St. Paul, MN (US)

(72) Inventors: Virginie Aristide Maas, Leichlingen (DE); Matthias Schmitz, Langenfeld (DE); Anja Patten, Monheim (DE); Michael Schneider, Grevenbroich (DE); Ralf Krack, Hilden (DE)

(73) Assignee: ECOLAB USA INC., St. Paul, MN (US)

( * ) Notice: Subject to any disclaimer, the term of this patent is extended or adjusted under 35 U.S.C. 154(b) by 187 days.

(21) Appl. No.: 18/606,407

(22) Filed: Mar. 15, 2024

(65) Prior Publication Data

US 2024/0306644 A1     Sep. 19, 2024

Related U.S. Application Data

(60) Provisional application No. 63/490,263, filed on Mar. 15, 2023.

(51) Int. Cl.
| | |
|---|---|
| *A01N 59/00* | (2006.01) |
| *A01N 25/04* | (2006.01) |
| *A01N 25/22* | (2006.01) |
| *A01P 1/00* | (2006.01) |

(52) U.S. Cl.
CPC ............. *A01N 59/00* (2013.01); *A01N 25/04* (2013.01); *A01N 25/22* (2013.01); *A01P 1/00* (2021.08)

(58) Field of Classification Search
CPC ....................................................... A01P 1/00
See application file for complete search history.

(56) References Cited

U.S. PATENT DOCUMENTS

| | | | |
|---|---|---|---|
| 3,192,250 | A | 6/1965 | Fields et al. |
| 3,583,922 | A | 6/1971 | McClain et al. |
| 5,196,095 | A | 3/1993 | Sudderth et al. |
| 5,209,976 | A | 5/1993 | Ogawa |
| 2003/0095890 | A1* | 5/2003 | Miikka et al. |
| 2009/0165818 | A1 | 7/2009 | Smith et al. |
| 2018/0072967 | A1 | 3/2018 | Sun et al. |

FOREIGN PATENT DOCUMENTS

| | | | |
|---|---|---|---|
| AU | 2017210546 A1 | 8/2017 | |
| CN | 103157451 B | 8/2014 | |
| CN | 106563290 A | 4/2017 | |
| CN | 106216115 B | 9/2018 | |
| CN | 110157911 A | 8/2019 | |
| CN | 114145309 * | 3/2022 | |
| DE | 43 35 669 A1 | 4/1995 | |
| EP | 1 424 311 B1 | 7/2012 | |
| IE | 80688 B1 | 12/1998 | |

| | | | |
|---|---|---|---|
| JP | 2020-012056 A | 1/2020 | |
| WO | 2010/138518 A2 | 12/2010 | |
| WO | WO 2013/012420 * | 1/2013 | |
| WO | 2016/192787 A1 | 12/2016 | |

OTHER PUBLICATIONS

Fang et al. (CN 114145309; published: Mar. 8, 2022; English machine translation obtained on Nov. 10, 2025). (Year: 2025).*
International Search Report and Written Opinion for Application No. PCT/US2024/020257 mailed Jul. 2, 2024.
Akbal, "Sorption of phenol and 4-chlorophenol onto pumice treated with cationic surfactant," Journal of Environmental Management, vol. 74, pp. 239-244 (2005).
Dargahi et al., "An Investigation and Comparison of Removing Heavy Metals (Lead and Chromium) from Aqueous Solutions Using Magnesium Oxide Nanoparticles," Polish Journal of Environmental Studies, vol. 25, No. 2, pp. 557-562 (2016).
Guérin et al., "Removal of heavy metals from contaminated water using industrial wastes containing calcium and magnesium," Journal of Cleaner Production, vol. 337, https://doi.org/10.1016/j.jclepro.2022.130472, pp. 1-9 (2022).
Jackowska et al., "Magnesium [II] as a factor eliminating heavy metal ions from soil," Zeszyty Problemowe Postępów Nauk Rolniczych, vol. 413, pp. 137-140 (1994).
Jiang et al., "Removal of the heavy metal ion nickel (II) via an adsorption method using flower globular magnesium hydroxide," Journal of Hazardous Materials, vol. 373, pp. 131-140 (2019).
Kim et al., "Treatment of Heavy Metal Wastewater by Ceramic Microfilter Functionalized with Magnesium Oxides," Water, Air, & Soil Pollution, vol. 232, article No. 498, 10.1007/s11270-021-05425-4, pp. 1-13 (2021).
Le, Ngoc Chung; Vo, Manh Tien; Quan, Hanh Quan, "Study on sorption ability of clorophyl and caroten by CaO, MgO, Al2O3, SiO2, MnO2, CuO, ZnO, Fe2O3, Cr2O3, TiO2. It's application for determination of pesticide residue in vegetable by gas chromatography," Scientific Notice, located online on Aug. 2, 2024 at: https://scholar.dlu.edu.vn/thuvienso/handle/DLU123456789/32267, 7 pages with English Summary.
Lin et al., "A rapid way to synthesize magnesium whitlockite microspheres for high efficiency removing heavy metals," Desalination and Water Treatment, doi: 10.5004/dwt.2019.24290, vol. 162, pp. 220-227 (Sep. 2019).
Ling et al., "Magnesium Oxide Embedded Nitrogen Self-Doped Biochar Composites: Fast and High-Efficiency Adsorption of Heavy Metals in an Aqueous Solution," Environmental Science & Technology, vol. 51, pp. 10081-10089 (2017).
Madzokere et al., "Heavy Metal Ion Effluent Discharge Containment Using Magnesium Oxide (MgO) Nanoparticles," Materials Today: Proceedings, vol. 4, pp. 9-18 (2017).

(Continued)

*Primary Examiner* — Genevieve S Alley

(74) *Attorney, Agent, or Firm* — Merchant & Gould, P.C.

(57) ABSTRACT

The present disclosure relates to concentrated, alkaline, hypochlorite compositions with a magnesium salt. The disclosed compositions have improved stability and can be used for cleaning, bleaching, or as an antimicrobial composition.

36 Claims, No Drawings

(56) References Cited

OTHER PUBLICATIONS

Mohamadin et al., "Chloroacetonitrile-Induced Toxicity and Oxidative Stress in Rat Gastric Epithelial Cells," Pharmacological Research, vol. 40, No. 4, pp. 377-383 (1999).

Nagarajah et al., "Synthesis of a unique nanostructured magnesium oxide coated magnetite cluster composite and its application for the removal of selected heavy metals," Separation and Purification Technology, vol. 174, pp. 290-300 (2017).

Sun et al., "Simultaneous catalytic ozonation degradation of metronidazole and removal of heavy metal from aqueous solution using nano-magnesium hydroxide," Environmental Technology, vol. 42, No. 6, https://doi.org/10.1080/09593330.2019.1648560, pp. 894-904 (2019).

Vafaeifard et al., "Novel self-assembled 3D flower-like magnesium hydroxide coated granular polyurethane: Implication of its potential application for the removal of heavy metals," Journal of Cleaner Production, vol. 216, pp. 495-503 (2019).

Van de Walle et al, "Use of a Granular Magnesium-based Adsorbent1 for Heavy Metal Removal and Acid Neutralization," 13th AESF/EPA Conference on Environmental Control of the Surface Finishing Industry, pp. 211-221 (1994).

Walter et al., "Removal of Metals from Metal Finishing Waste Water Using a Granular, Magnesium-based Adsorbent," The Proceedings of the 81st AESF Annual Technical Conference, pp. 305-308 (1994).

Wang et al., "Removal of heavy metal ion cobalt (II) from wastewater via adsorption method using microcrystalline cellulose-magnesium hydroxide," International Journal of Biological Macromolecules, vol. 189, pp. 607-617 (2021).

* cited by examiner

STABLE CHLORINATED ALKALINE PRODUCTS

CROSS-REFERENCE TO RELATED APPLICATION

This application claims the benefit of and priority to Provisional Application No. 63/490,263 filed on Mar. 15, 2023, which application is incorporated herein by reference.

BACKGROUND

Chlorinated alkaline products are widely used in consumer and industrial applications as cleaners, bleaches, and antimicrobial products. Consumer chlorinated alkaline products are ready-to-use dilute formulations. Industrial products are sold as more concentrated products than consumer products. These concentrated formulas are diluted with water at the time they are used.

In some cases, the starting materials for the chlorinated alkaline products are contaminated with trace amounts of metals such as iron and nickel. When those starting materials are formulated into a concentrated, chlorinated, alkaline product, the trace metals can react to form black particles, metal oxides, and precipitates. In some cases, these metal oxides and precipitates are visible and undesirable by the end user. It is against this background that the present disclosure is made.

SUMMARY

Surprisingly, it has been discovered that magnesium salts prevent the formation of black particles, metal oxides, and precipitates in concentrated, chlorinated alkaline compositions.

Accordingly, in some embodiments, the present disclosure relates to methods for reducing microorganisms on a hard surface via a concentrate diluted with water, the concentrate comprising sodium hypochlorite, alkali metal hydroxides, magnesium salt, and water. In some embodiments, the magnesium salt is selected from magnesium chloride, magnesium chloride anhydrous, magnesium chloride hexahydrate, magnesium oxide, magnesium carbonate, magnesium stearate, trimagnesium dicitrate, magnesium sulfate heptahydrate, and mixtures thereof. In some embodiments, the concentrate may also contain components such as surfactants, foaming agents, sequestering agents, other components, or combinations of these and/or other components. In some embodiments, this concentrate is free of black particles, metal oxides, and visible precipitates for up to three months.

In some embodiments, the present disclosure relates to a method of stabilizing a concentrated, chlorinated, alkaline composition by adding a magnesium salt to create a new concentrated, chlorinated, alkaline composition. In some embodiments the composition may consist of sodium hypochlorite, alkali metal hydroxides, magnesium salt, and water. In some embodiments, the magnesium salt is selected from magnesium chloride, magnesium chloride anhydrous, magnesium chloride hexahydrate, magnesium oxide, magnesium carbonate, magnesium stearate, trimagnesium dicitrate, magnesium sulfate heptahydrate, and mixtures thereof. In some embodiments, the composition may also contain components such as surfactants, foaming agents, sequestering agents, other components, or combinations of these and/or other components. In some embodiments, this composition is free of black particles, metal oxides, and visible precipitates up to 3 months.

In some embodiments, the present disclosure relates to stable concentrated, aqueous, chlorinated, alkaline compositions with an alkali metal hypochlorite, an alkali metal hydroxide, a magnesium salt, and water. In some embodiments, the magnesium salt is selected from magnesium chloride, magnesium chloride anhydrous, magnesium chloride hexahydrate, magnesium oxide, magnesium carbonate, magnesium stearate, trimagnesium dicitrate, magnesium sulfate heptahydrate, and mixtures thereof. In some embodiments, the compositions are free of metal oxide or visible precipitates up to 3 months. In some embodiments, the compositions exhibit antimicrobial properties.

DETAILED DESCRIPTION

Concentrated, chlorinated, alkaline products are desirable in industrial applications for cleaning, bleaching, or antimicrobial properties. Using concentrated products allows for shipping products with less water and more active ingredients, which is especially desirable in industrial applications that use larger quantities of product. Consumer chlorinated products are formulated as ready-to-use products that are already diluted.

As discussed above, in some cases, the starting materials for the chlorinated alkaline products are contaminated with trace amounts of metals such as iron, nickel, aluminum, cobalt, copper, zinc, manganese, and lead. When those starting materials are formulated into a concentrated, chlorinated, alkaline product, the trace metals can react to form black particles, metal oxides, and precipitates. In some cases, these black particles, metal oxides, and precipitates are visible and undesirable by the end user. In an extreme example, the black particles, metal oxides, and precipitates can reduce the available hypochlorite and in turn reduce the bleaching or antimicrobial activity of the composition.

The starting raw materials such as the alkali metal hydroxide and alkali metal hypochlorite can be made in a number of ways. For example, alkali metal hydroxide can be made using a mercury cell process that produces an extremely pure alkali metal hydroxide product. While this mercury-based process produces a very pure product, it is not a desirable process from an environmental perspective because of its reliance on mercury. Other processes, such as membrane electrolysis, are capable of producing alkali metal hydroxide without needing to use mercury and are viewed as being more environmentally friendly. When alkali metal hydroxide made from these alternative processes is concentrated, the concentration process contaminates the alkali metal hydroxide with trace metals. When the concentrated alkali metal hydroxide is later used to generate concentrated, chlorinated products, black particles, metal oxides, and precipitates are formed and in some cases are visible to the end user.

Surprisingly, it has been discovered that magnesium salts prevent the formation of black particles, metal oxides, and precipitates in concentrated, chlorinated alkaline compositions. The benefits of magnesium salts are unexpected in view of the fact that other cations such as calcium, sodium, and potassium do not provide the same benefits. While not wishing to be bound by theory, it is believed that the magnesium salts form a complex with trace metals that inhibits the ability of the metals to form metal oxides. Whatever the mechanism, concentrated, chlorinated alkaline compositions made with magnesium salts remain stable and without significant concentrations of black particles, metal oxides, and precipitates.

Alkali Metal Hydroxide

The disclosed compositions include an alkali metal hydroxide such as sodium hydroxide, potassium hydroxide, and mixtures thereof. The disclosed compositions are beneficial in that they allow a formulator to use an alkali metal hydroxide made from a variety of processes, includes processes that provide a lower purity of the alkali metal hydroxide or an alkali metal hydroxide product with a higher concentration of metal or other contaminants. This flexibility means that a formulator can select alkali metal hydroxide sources that are more desirable from a cost, regulatory, environmental, or toxicity perspective without negatively affecting the stability of the finished product.

The alkali metal hydroxide may be present in the disclosed concentrate compositions in amounts from about 1 to about 50 wt. %, from about 5 to about 30 wt. %, or from about 7 to about 15 wt. %.

Hypochlorite

The disclosed compositions include an alkali metal or alkaline earth metal hypochlorite such as sodium hypochlorite, potassium hypochlorite, magnesium hypochlorite, calcium hypochlorite, and mixtures thereof. A preferred alkali metal hypochlorite is sodium hypochlorite. The alkali metal hypochlorite may be present in the disclosed concentrate compositions in amounts from about 1 to about 20 wt. %, from about 1 to about 15 wt. %, or from about 1 to about 10 wt. %.

Magnesium Salt

The disclosed compositions include a magnesium salt. Exemplary magnesium salts include magnesium acetate, magnesium benzoate, magnesium bromide, magnesium bromate, magnesium chlorate, magnesium chloride, magnesium chloride hexahydrate, magnesium chromate, magnesium citrate, magnesium formate, magnesium hexafluorosilicate, magnesium iodate, magnesium iodide, magnesium lactate, magnesium molybdate, magnesium nitrate, magnesium perchlorate, magnesium phosphinate, magnesium salicylate, magnesium sulfate, magnesium sulfate heptahydrate, magnesium sulfite, magnesium tartrate, magnesium thiosulfate, magnesium oxide, magnesium carbonate, magnesium stearate, trimagnesium dicitrate, a hydrate thereof, and a mixture thereof. These salts can be provided as hydrated salts or anhydrous salts. Preferred magnesium salts are water soluble. In some embodiments, the magnesium salt is preferably at least one of magnesium chloride anhydrous, magnesium oxide, magnesium chloride hexahydrate, or mixtures thereof. The magnesium salt may be present in the disclosed concentrate compositions in amounts from about 0.0001 to about 5 wt. %, from about 0.0005 to about 1 wt. %, or from about 0.001 to about 1 wt. %. Magnesium ions may be present in the disclosed concentrate composition in amounts from about 1 to about 9 ppm, from about 2 to about 7 ppm, or preferably from about 3 to about 6 ppm. In some embodiments, the magnesium ions may be part of a magnesium salt.

Water

The disclosed compositions are preferably liquids, thickened liquids, gels, or foams and include water. In some embodiments, the water is present in amounts from about 40 to about 95 wt. %, from about 60 to about 90 wt. %, from about 60 to about 85 wt. %, or from about 70 to about 85 wt. %.

Additional Ingredients

The disclosed compositions may optionally include one or more additional ingredients including surfactants and foaming agents, chelating agents, thickening agents, gelling agents, sequestering agents, and mixtures thereof.

Surfactants and Foaming Agents

Generally, the composition of the invention may also comprise a surfactant. Preferably, the surfactant is stable in the presence of high alkalinity and bleach, including chlorine bleaches. Generally, anionic surfactants are preferred for use in the composition of the invention although certain other surfactants may be used. The anionic surfactants provide detergency and may increase viscosity. Further, the surfactants hydrate and stabilize the inorganic thickening agent.

Exemplary anionic surfactants which are suitable for the compositions of the invention include, but are not limited to, water soluble alkyl and alkyl ether sulfates and sulfonates, containing from about 8 to about 18 carbon atoms.

Specific examples of sulfate salts which can be employed in the compositions of the invention include sodium or potassium lauryl sulfate, sodium or potassium stearyl sulfate, sodium or potassium palmityl sulfate, sodium or potassium decyl sulfate, sodium or potassium myristyl sulfate, potassium dodecyl sulfate, sodium or potassium tallow sulfate, sodium or potassium coconut sulfate, magnesium coconut sulfate, calcium coconut sulfate, and mixtures thereof.

Sulfonated surfactants are also useful in the invention including alkyl, aryl, and alkyl/aryl sulfonates such as alkali metal C10-C18 alkyl/aryl sulfonates such as sodium alkyl benzene sulfonates and sodium dodecyl benzene sulfonate. Also useful are alpha-olefin sulfonates, alkyl naphthalene sodium sulfonates and the like, and the alkali metal salt of secondary alkane sulfonates, an example of which is the Hostapur SAS from Hoechst Celanese.

Certain chlorine stable surfactants which are not anionic may also be used such as amine oxides like alkyl C12-16 dimethyl amine oxide, decyldimethyl amine oxide, and octadecyl dimethyl amine oxide available as Barlox 12, 10S and 18S, respectively; and carboxylate compounds such as Emcol CBA 50 from Witco (trideceth-7 carboxylic acid).

Preferably, anionic linear or branched alkyl diphenyl ether sulfonates are used such as those available from Dow Chemical Co. as Dow Fax® 3B-2, 2A-1, and C6L. These surfactants may be either mono or di-alkyl as well as mono or di-sulfonate. Generally, the surfactant may be used at a concentration of about 0 to 10 wt-%, preferably 1 to 6 wt-%, and more preferably 1 to 4 wt-% of the composition as a whole.

Chelating Agents

In accordance with the invention, a builder may also be used in the composition of the invention. Builders complex hardness ions such as Mg and Ca, maintain the pH of the composition and increase the efficacy of the cleaning system. Generally, any number of builders may be used which are stable in bleach, and especially chlorine bleach, compositions. Generally, any builder used may be organic or inorganic.

One preferred builder salt which may be used with the invention is an alkali metal polyphosphate such as sodium tripolyphosphate ("STPP") or potassium tripolyphosphate ("KTPP") or a mixture thereof. In place of all or part of the alkali metal polyphosphate one or more other detergent builder salts can be used. Other suitable builder salts are alkali metal borates, phosphates and carbonates and bicarbonate, and mixtures thereof.

Specific examples of such builders are sodium tetraborate, sodium nitrilotriacetate, sodium pyrophosphate, potassium pyrophosphate, sodium bicarbonate, sodium hexametaphosphate, sodium sesquicarbonate, sodium mono- and diorthophosphate and potassium bicarbonate, and mixtures thereof. Other useful builders include the Dequest® product line of phosphates such as tetrasodium 1-hydroxyethylidene-1,1-diphosphonate and its acid form (Dequest® 2016 and 2010, respectively) as well as pentasodium diethylene triamine pentamethylene phosphate and its acid form (Dequest® 2066 and 2060, respectively). Also useful are phosphate compounds sold by Witco such as Emphos 10TP.

The builder salt, e.g. STPP or KTTP or mixtures thereof, may be used in the composition of the invention in an amount of up to about 20 wt-%, preferably about 1 to 15 wt-% and more preferably about 3 to 13 wt-%.

Inorganic builders such as STPP or KTTP may be replaced in whole or in part by organic builder salts. Since the compositions of this invention are generally highly concentrated, and, therefore, may be used at relatively low dosages, it may be desirable to supplement any phosphate builder (such as sodium tripolyphosphate) with an auxiliary builder such as an alkali metal polycarboxylic acid. Suitable alkali metal polycarboxylic acids are alkali metal salts of maleic and acrylic acid, and salts thereof. Also useful are alkali metal polyacrylates, and polyacrylate-maleate copolymers that are stable in the presence of chlorine bleach, (e.g. sodium polyacrylate-maleic copolymers). When used, organic builders may be present in a concentration ranging from 0 to 10 wt-%, preferably from 2 to 8 wt-%, and more preferably from 3 to 6 wt-% based on the composition as a whole.

Thickening Agents and Gelling Agents

The composition of the invention also comprises a thickener. The thickeners or suspending agents that can be used in accordance with the invention to provide the aqueous medium with thickened properties. Organic polymeric thickeners and inorganic colloid forming clay materials are examples of those thickeners which may be used. The thickeners should be stable to high alkalinity and stable to chlorine bleach compounds such as sodium hypochlorite.

Useful organic polymeric thickeners include polycarboxylate polymers having a molecular weight from about 500,000 to about 4,000,000, preferably from about 1,000,000 to about 4,000,000, with, preferably, from about 0.5% to about 4% crosslinking. Preferred polycarboxylate polymers include polyacrylate polymers including those sold under trade names Carbopol®, Acrysol® ICS-1 and Sokalan®. The preferred polymers are polyacrylates. Other monomers besides acrylic acid can be used to form these polymers including such monomers as ethylene and propylene which act as diluents, and maleic anhydride which acts as a source of additional carboxylic groups.

The molecular weight and level of polycarboxylic polymer may be adjusted to give the desired product stability at the proper viscosity. The typical range of polycarboxylate polymer is from about 0.1 wt-% to about 10 wt-%, preferably from about 0.5 wt-% to about 8 wt-%, more preferably from about 0.5 wt-% to about 6 wt-% of the composition.

Other exemplary thickeners include colloid-forming clays, for example, such as smectite and/or attapulgite types. Inorganic colloid forming clays tend to provide higher stability in the presence of chlorine and do not thin when subjected to shear. The amount of the thickener used will depend on the particular thickener used, but sufficient thickener is added to the formulation to provide the composition with a thixotropy index of about 2 to 15, more preferably about 2 to 10. The thixotropy index is the ratio of the apparent Brookfield viscosity (#4 spindle at 25° C.) of the 3 rpm measurement to the 30 rpm measurement, after 1 minute of shear.

The clay materials which function in the instant composition as thickening and corrosion protection agents can be described as expandable layered clays, i.e., aluminosilicates and magnesium silicates. The term "expandable" as used to describe the instant clays relates to the ability of the layered clay structure to be swollen, or expanded, on contact with water. The expandable clays used herein are those materials classified geologically as smectites (or montmorillonite) and attapulgites (or polygorskites).

Smectites are three-layered clays. There are two distinct classes of smectite-type clays. In the first, aluminum oxide is present in the silicate crystal lattice; in the second class of smectites, magnesium oxide is present in the silicate crystal lattice. The general formulas of these smectites are $Al_2(Si_2O_5)_2(OH)_2$ and $Mg_3(Si_2O_5)(OH)_2$, for the aluminum and magnesium oxide type clays, respectively. It is to be recognized that the range of the water of hydration in the above formulas may vary with the processing to which the clay has been subjected.

Commercially available clays include, for example, montmorillonite (bentonite), volchonskoite, nontronite, beidellite, hectorite, saponite, sauconite and vermiculite. The clays herein are available under various trade names such as Thixogel No. 1 and Gelwhite GP from Georgia Kaolin Company, Elizabeth, N.J. (both montmorillonites); Volclay BC and Volclay No. 325, from American Colloid Company, Skokie, Ill.; Black Hills Bentonite BH 450, from International Minerals and Chemicals; Veegum Pro and Veegum F, from R. T. Vanderbilt (both hectorites); Barasym NAS-100, Barasym NAH-100, Barasym SMM 200, and Barasym LIH-200, all synthetic hectorites and saponites marketed by Baroid Division, NL Industries, Inc.

A second type of expandable clay material useful in the instant invention is classified geologically as attapulgite (polygorskite). Attapulgites are magnesium-rich clays having principles of superposition of tetrahedral and octahedral unit cell elements different from the smectites.

A typical attapulgite analyses yields 55.02% SiO2; 10.24% Al2 O3; 3.53% Fe2 O3; 10.45% MgO; 0.47% K2O; 9.73% H2O removed at 150° C.; 10.13% H2O removed at higher temperatures.

Like the smectites, attapulgite clays are commercially available. For example, such clays are marketed under the tradename Attagel, i.e. Attagel 40, Attagel 50 and Attagel 150 from Engelhard Minerals & Chemicals Corporation.

The preferred clay thickeners comprise the inorganic, colloid forming clays of smectite and/or attapulgite types. Preferred clays include products from Vanderbilt Chemical Company such as VanGel O®. Clay thickeners may be used in amounts of about 0.1 to 10 wt-%, preferably 0.5 to 8 wt-% and more preferably 0.5 to 6 wt-%.

Viscosity

The disclosed concentrate compositions are preferably liquids, foams, or gels. In some embodiments the viscosity is less than 500 cps, less than 200 cps, or preferably less than 100 cps when measured using a Brookfield viscometer, with spindle 1 at 200 rpm and at a temperature of 20° C. In some embodiments the viscosity is between 1 and 10,000 cps, between 10 and 5000 cps, or preferably between 50 and 1000 cps when measured using a Brookfield viscometer, with spindle 1 at 200 rpm at a temperature of 20° C.

Alkalinity

In some embodiments, the disclosed compositions have a pH in the range of about 7 to about 14, about 8 to about 14, about 9 to about 14, about 10 to about 14, about 11 to about 14, or about 12 to about 14.

Particle Contamination

Black particle contamination or other particle or sediment contamination can be detected visually. Black particles formed in concentrated bleach products may include nickel oxides, iron oxides or a combination of these compounds. Visually detected black particle contamination may be of a light to nearly invisible quantity, a medium quantity, or a high quantity. Other particles or sediments formed in concentrated bleach product may include calcium in excess of 6 ppm or magnesium in excess of 9 ppm. Visually detected other particle or sediment contamination may be of a light to nearly invisible quantity, a medium quantity, or a high quantity.

The disclosed compositions have improved stability and limit or eliminate the formation of metal oxide particles and precipitates in concentrated chlorinated alkaline compositions. In some embodiments, the disclosed concentrated, chlorinated, alkaline compositions have no visible metal oxide particles after storage for 1 week, 2 weeks, 1 month, 6 weeks, 2 months, or 3 months. In some embodiments, the disclosed concentrated, chlorinated, alkaline compositions have no visible metal oxide particles after storage for 1 week, 2 weeks, 1 month, 6 weeks, 2 months, or 3 months when stored at temperatures of room temperature, 0° C., 25° C., or 35° C. In some embodiments, the disclosed concentrated, chlorinated, alkaline compositions are free of metal oxide particles after storage for 1 week, 2 weeks, 1 month, 6 weeks, 2 months, or 3 months. In some embodiments, the disclosed concentrated, chlorinated, alkaline compositions are free of metal oxide particles after storage for 1 week, 2 weeks, 1 month, 6 weeks, 2 months, or 3 months when stored at temperatures of room temperature, 0° C., 25° C., or 35° C. In some embodiments, the disclosed concentrated, chlorinated, alkaline compositions have no visible precipitates after storage for 1 week, 2 weeks, 1 month, 6 weeks, 2 months, or 3 months. In some embodiments, the disclosed concentrated, chlorinated, alkaline compositions have no visible precipitates after storage for 1 week, 2 weeks, 1 month, 6 weeks, 2 months, or 3 months when stored at temperatures of room temperature, 0° C., 25° C., or 35° C. In some embodiments, the disclosed concentrated, chlorinated, alkaline compositions are free of precipitates after storage for 1 week, 2 weeks, 1 month, 6 weeks, 2 months, or 3 months. In some embodiments, the disclosed concentrated, chlorinated, alkaline compositions are free of precipitates after storage for 1 week, 2 weeks, 1 month, 6 weeks, 2 months, or 3 months when stored at temperatures of room temperature, 0° C., 25° C., or 35° C. In some embodiments, the disclosed compositions are stable for up to 1 month, up to 2 months, up to 6 months, up to 9 months, up to 10 months, up to 11 months, up to 12 months, or up to 18 months when stored at room temperature, 0° C., 25° C., or 35° C. In some embodiments, the disclosed compositions are free of metal oxide particles or visible precipitates for up to 1 month, up to 2 months, up to 6 months, up to 9 months, up to 10 months, up to 11 months, up to 12 months, or up to 18 months when stored at room temperature, 0° C., 25° C., or 35° C.

Methods of Use

The disclosed compositions can be used in any application where chlorinated products are desired. For example, in some embodiments, the disclosed concentrated chlorinated alkaline compositions are used to clean, bleach, disinfect, or sanitize a surface. Exemplary surfaces include production equipment in the food and beverage industry, tanks, pipes, mixers, walls, ceilings, tables, countertops, floors, drains, knives, saws, instruments, tools, worktables, conveyor belts, trucks, tanker cars, train cars, clean-in-place equipment, animal stalls or crates, produce crates or displace cases, surfaces in grocery stores or butcher shops, surfaces in childcare and long term care facilities, or other surfaces. The disclosed compositions can be used to clean, bleach, disinfect, or sanitize surfaces in the food and beverage industries, hospitals, veterinary facilities, childcare facilities, long term care facilities, commercial real estate, schools, grocery stores, kitchens, restaurants, and other facilities. In some embodiments, the disclosed compositions can be used to bleach or sanitize textiles, laundry, upholstery, drapery, carpet, or other soft surfaces. In some embodiments, the disclosed compositions can be used to treat liquids such as swimming pools, hot tubs, cooling tower water, drinking water, and food and beverage processing water.

When used to clean, the disclosed concentrated, chlorinated alkaline compositions can be diluted with water to form a use solution. The use solution may have a concentration from about 0.1 to about 10%, from about 0.3 to about 7%, or from about 0.5 to about 5% of the concentrate. The use solution can be applied to a surface by spraying, wiping, misting, foaming, fogging, mopping, squirting, flooding, as part of a clean-in-place program. The composition may be used at temperatures ranging from 0° C. to 70° C., from 25° C. to 35° C., from 45° C. to 70° C., or at room temperature. The use solution may contact the surface for a period of time of 10 seconds to 30 minutes, 30 seconds to 30 minutes, 30 seconds to 10 minutes, 30 seconds to 5 minutes, 10 minutes to 30 minutes, or may remain on the surface and not rinsed or wiped off.

When used to bleach, the disclosed concentrated, chlorinated alkaline compositions can be diluted with water to form a use solution. The use solution may have a concentration from about 0.1 to about 10%, from about 0.3 to about 7%, or from about 0.5 to about 5%. The use solution may be applied to a hard surface as described above in the discussion on cleaning. When used to bleach a soft surface such as a textile, the use solution may be applied to a textile as a pretreatment or as part of a bleaching process in a homestyle washing machine, a washer-extractor, or batch or continuous tunnel washer.

When used to reduce microorganisms as part of a disinfecting or sanitizing process, the disclosed compositions reduce microorganisms by 3-logs, 4-logs, or 5-logs within 5 minutes at 20° C.

Methods of Making

The disclosed compositions can be made by mixing the materials together. In some embodiments, magnesium compounds were added to water prior to the addition of other ingredients. In some embodiments, it is desirable to add the materials while cooling the mixture or to cool the mixture immediately following the addition of the materials because some of the materials cause an exothermic reaction when combined. In some embodiments, the composition is homogenized and filtered with a 1-micron filter.

EXAMPLES

Example 1

Example 1 screened a number of materials for their ability to prevent the formation of black metal oxide particles in a composition. For this test, three replicates each of eight formulas were prepared and stored at 0° C. or 25° C. for a period of four to six weeks, or at 35° C. for a period of four weeks. The formulas were observed after a period of one day, a period of one week, a period of two weeks, a period of one month, and a period of six weeks. A "pass" indicates that no black particles were present in the formula and a "fail" indicates that black particles were found in the formula. Table 1 below shows the formulas that were tested and the results of the testing.

TABLE 1

| Test Substance | Results |
| --- | --- |
| Calcium carbonate | Fail |
| Magnesium carbonate | Pass |
| Calcium nitrate tetrahydrate | Fail |
| Magnesium sulfate heptahydrate | Pass |
| Sodium bicarbonate | Fail |
| Potassium bicarbonate | Fail |
| Silicon dioxide | Fail |
| Disodium hydrogen phosphate anhydrous | Fail |

Table 1 indicates that only magnesium carbonate and magnesium sulfate heptahydrate were able to inhibit the formation of black particles. Calcium, sodium, and potassium salts and silicon dioxide were not able to prevent the formation of black particles.

Example 2

Example 2 screened various magnesium salts for their ability to prevent the formation of black metal oxide particles. These formulas were stored at 0° C., 25° C., or 35° C. and tested after 1 week or 2 weeks of storage. The formulas were scored on a scale looking for both black particle formation and precipitation. For black particle formation, the following scale was used: 0=no black particles; 0-1=very light amount of black particles, almost invisible; 1=slight amount of black particles; 2=medium amount of black particles; 3=high amount of black particles. For precipitate formation, the following scale was used: 0=no other particles, no sediment; 0-1=very light amounts of other particles or sediment, almost invisible; 1=slight quantity of other particles or sediment; 2=medium quantity of other particles or sediment; 3=high quantity of other particles or sediment. A score of 0/0 indicates that the sample had no black particles and no other particles or sediment. Table 2 shows the formulas and the results of the testing.

The data in Table 2 indicates all magnesium salts tested prevented the formation of black particles at all temperatures and periods of time tested. Table 3 also indicates none of magnesium salts test completely prevented the formation of sediments at any temperature or period of time tested. Two of the magnesium salts tested, magnesium carbonate and magnesium chloride anhydrous saw medium sediment formation at weeks 1 and 2 when stored at 0° C. At all other temperatures magnesium carbonate and magnesium chloride anhydrous saw light amounts of sediment formation at weeks 1 and 2. Magnesium oxide saw light sediment formation at all temperatures and time periods tested. Magnesium stearate and tri-magnesium dicitrate nonahydrate saw high sediment formation at all temperatures and time periods tested.

Example 3

Based on the testing in Example 2, magnesium chloride hexahydrate was selected as a preferred magnesium salt. Three formulas were prepared using magnesium chloride hexahydrate and are listed in Table 3.

TABLE 3

| Raw Material | Formula 1 | Formula 2 | Formula 3 |
| --- | --- | --- | --- |
| DI Water | 34.6 wt. % | 46.1 wt. % | 24.9 wt. % |
| MGDA, methyl glycine diacetic acid, trisodium salt in water | 0.01 wt. % | 0.00 wt. % | 0.01 wt. % |
| magnesium chloride hexahydrate | 0.002 wt. % | 0.002 wt. % | 0.001 wt. % |
| sodium hydroxide 50% | 18.00 wt. % | 18.00 wt. % | 18.00 wt. % |
| phosphobutane tricarboxylic acid 50 | 2.40 wt. % | 2.40 wt. % | 2.40 wt. % |
| sodium hypochlorite 12.5% | 45.00 wt. % | 45.00 wt. % | 45.00 wt. % |
| Total Weight | 100.000 wt. % | 100.000 wt. % | 100.000 wt. % |

These formulas were stored at 0° C., 25° C., or 35° C. and tested after 1 week, 2 weeks, or 1 month. Additional tests were performed on formulas stored at 0° C. and 25° C. at 6 weeks, 2 months, or 3 months of storage. The formulas were scored on a scale looking for both black particle formation and precipitation. For black particle formation, the following scale was used: 0=no black particles; 0-1=very light amount of black particles, almost invisible; 1=slight amount of black particles; 2=medium amount of black particles; 3=high amount of black particles. For precipitate formation, the

TABLE 2

| Test Substance | Stability at week 1 at 0° C. | Stability at week 2 at 0° C. | Stability at week 1 at 25° C. | Stability at week 2 at 25° C. | Stability at week 1 at 35° C. | Stability at week 2 at 35° C. |
| --- | --- | --- | --- | --- | --- | --- |
| Magnesium Carbonate | 0/2 | 0/2 | 0/1 | 0/1 | 0/1 | 0/1 |
| Magnesium Chloride Anhydrous | 0/2 | 0/2 | 0/1 | 0/1 | 0/1 | 0/1 |
| Magnesium Oxide | 0/1 | 0/1 | 0/1 | 0/1 | 0/1 | 0/1 |
| Magnesium Stearate | 0/3 | 0/3 | 0/3 | 0/3 | 0/3 | 0/3 |
| Tri-Magnesium Dicitrate Nonahydrate | 0/3 | 0/3 | 0/3 | 0/3 | 0/3 | 0/3 | following scale was used: 0=no other particles, no sediment; 0-1=very light amounts of other particles or sediment, almost invisible; 1=slight quantity of other particles or sediment; 2=medium quantity of other particles or sediment; 3=high quantity of other particles or sediment. The storage stability results are reported in Table 4. A score of 0/0 indicates that the sample had no black particles and no other particles or sediment.

TABLE 4

|  | Formula 1 | Formula 2 | Formula 3 |
|---|---|---|---|
| after mixing | 0/0 | 0/0 | 0/0 |
| stability at week 1 at 0° C. | 0/0 | 0/0 | 0/0 |
| stability at week 1 at 25° C. | 0/0 | 0/0 | 0/0 |
| stability at week 1 at 35° C. | 0/0 | 0/0 | 0/0 |
| stability at week 2 at 0° C. | 0/0 | 0/0 | 0/0 |
| stability at week 2 at 25° C. | 0/0 | 0/0 | 0/0 |
| stability at week 2 at 35° C. | 0/0 | 0/0 | 0/0 |
| stability at month 1 at 0° C. | 0/0 | 0/0 | 0/0 |
| stability at month 1 at 25° C. | 0/0 | 0/0 | 0/0 |
| stability at month 1 at 35° C. | 0/0 | 0/0 | 0/0 |
| stability at week 6 at 0° C. | 0/0 | 0/0 | 0/0 |
| stability at week 6 at 25° C. | 0/0 | 0/0 | 0/0 |
| stability at month 2 at 0° C. | 0/0 | 0/0 | 0/0 |
| stability at month 2 at 25° C. | 0/0 | 0/0 | 0/0 |
| stability at month 3 at 0° C. | 0/0 | 0/0 | 0/0 |
| stability at month 3 at 25° C. | 0/0 | 0/0 | 0/0 |

The results in Table 4 indicate that none of the samples with magnesium chloride hexahydrate had black particles, other particles, or sediment after 1 month at 0° C., 25° C., or 35° C. or after 3 months of storage at 0° C. or 25° C.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A concentrated, chlorinated, alkaline composition comprising:
   a. from about 1 wt-% to about 15 wt-% sodium hypochlorite;
   b. from about 7 wt-% to about 30 wt-% alkali metal hydroxide;
   c. from about 2 ppm to about 9 ppm of a magnesium ion; and
   d. from about 55 wt-% to about 85 wt-% water,
   wherein the magnesium ion is part of a magnesium salt selected from the group consisting of magnesium chloride anhydrous, magnesium chloride hexahydrate, magnesium oxide, magnesium carbonate, magnesium stearate, trimagnesium dicitrate, magnesium sulfate heptahydrate, and mixtures thereof; and wherein the composition is free of visible black particles and metal oxides after 3 months.

2. The composition of claim 1, further comprising an additional material selected from the group consisting of a surfactant, a chelating agent, a thickening agent, a gelling agent, a foaming agent, a sequestering agent, and mixtures thereof.

3. The composition of claim 1, wherein the composition has a viscosity of less than 100 cps, using a Brookfield viscometer, with spindle 1, at 200 rpm, at 20° C.

4. The composition of claim 1, wherein the magnesium salt is selected from the group consisting of magnesium oxide, magnesium chloride anhydrous, and magnesium chloride hexahydrate.

5. The composition of claim 1, wherein when the magnesium salt is magnesium chloride hexahydrate, the composition is free of precipitates for 3 months.

6. The composition of claim 1, wherein the composition has a pH of 11 to 13.

7. A chlorinated, alkaline, use composition comprising:
   a. about 0.1 to about 10% of a concentrated composition comprising:
      i. from about 0.1 wt-% to about 10 wt-% sodium hypochlorite;
      ii. from about 7 wt-% to about 30 wt-% alkali metal hydroxide;
      iii. from about 2 ppm to about 9 ppm of a magnesium ion;
      iv. from about 55 wt-% to about 85 wt-% water; and
   b. 90 to 99.9% water,
      wherein the magnesium ion is part of a magnesium salt selected from the group consisting of magnesium chloride anhydrous, magnesium chloride hexahydrate, magnesium oxide, magnesium carbonate, magnesium stearate, trimagnesium dicitrate, magnesium sulfate heptahydrate, and mixtures thereof; and wherein the concentrated composition is free of visible black and, metal oxides after 3 months.

8. The composition of claim 7, further comprising an additional material selected from the group consisting of a surfactant, a chelating agent, a thickening agent, a gelling agent, a foaming agent, a sequestering agent, and mixtures thereof.

9. The composition of claim 7, wherein the concentrated composition has a viscosity of less than 100 cps, using a Brookfield viscometer, with spindle 1, at 200 rpm, at 20° C.

10. The composition of claim 7, wherein the magnesium salt is selected from the group consisting of magnesium oxide, magnesium chloride anhydrous, and magnesium chloride hexahydrate.

11. The composition of claim 7, wherein when the magnesium salt is magnesium chloride hexahydrate, the composition is free of precipitates for 3 months.

12. The composition of claim 7, wherein the concentrated composition has a pH of 11 to 13.

13. A method of reducing microorganisms, the method comprising:
   diluting a concentrate composition with water to form a use solution, the concentrate composition comprising:
   a. from about 1 wt-% to about 15 wt-% sodium hypochlorite;
   b. from about 7 wt-% to about 30 wt-% alkali metal hydroxide;
   c. from about 2 ppm to about 9 ppm of a magnesium ion; and
   d. from about 55 wt-% to about 85 wt-% water,
      wherein the magnesium ion is part of a magnesium salt selected from the group consisting of magnesium chloride anhydrous, magnesium chloride hexahydrate, magnesium oxide, magnesium carbonate, magnesium stearate, trimagnesium dicitrate, magnesium sulfate heptahydrate, and mixtures thereof; and wherein the concentrate composition is free of visible black particles and metal oxides after 3 months; and applying the use solution to a hard surface, a soft surface, or a liquid.

14. The method of claim 13, wherein the concentrate composition further comprises an additional material selected from the group consisting of a surfactant, a chelating agent, a thickening agent, a gelling agent, a foaming agent, a sequestering agent, and mixtures thereof.

15. The method of claim 13, wherein the concentrate composition has a viscosity of less than 100 cps, using a Brookfield viscometer, with spindle 1, at 200 rpm, at 20° C.

16. The method of claim 13, wherein when the magnesium salt is magnesium chloride hexahydrate, the composition is free of precipitates after 3 months.

17. The composition of claim 13, wherein the concentrate composition has a pH of 11 to 13.

18. The method of claim 13, wherein the use solution comprises about 0.1% to about 10% of the concentrate composition after dilution.

19. The method of claim 13, wherein the use solution is applied by spraying, wiping, misting, foaming, fogging, mopping, squirting, flooding, or as part of a clean-in-place program.

20. The method of claim 13, wherein the hard surface is selected from the group consisting of tanks, pipes, mixers, walls, ceilings, tables, countertops, floors, drains, knives, saws, instruments, tools, worktables, conveyor belts, trucks, tanker cars, train cars, clean-in-place equipment, animal stalls, animal crates, produce crates, displace cases, surfaces in grocery stores, surfaces in butcher shops, surfaces in childcare facilities, surfaces in long term care facilities, and combinations thereof.

21. The method of claim 13, wherein the soft surface is selected from the group consisting of textiles, laundry, upholstery, drapery, carpet, and combinations thereof.

22. The method of claim 13, wherein the liquid is selected from the group consisting of swimming pools, hot tubs, cooling tower water, drinking water, food and beverage processing water, and combinations thereof.

23. The method of claim 13, wherein the use solution contacts the hard surface, the soft surface, or the liquid for a period of time of 10 seconds to 30 minutes.

24. A method of stabilizing a concentrated, chlorinated, alkaline composition comprising:

adding a magnesium salt to the concentrated chlorinated, alkaline composition to form a concentrate composition comprising:

a. from about 1 wt-% to about 15 wt-% sodium hypochlorite;
b. from about 7 wt-% to about 30 wt-% alkali metal hydroxide;

c. from about 3 ppm to about 9 ppm of a magnesium ion; and
d. from about 70 wt-% to about 85 wt-% water,
wherein the magnesium ion is part of a magnesium salt selected from the group consisting of magnesium chloride anhydrous, magnesium chloride hexahydrate, magnesium oxide, magnesium carbonate, magnesium stearate, trimagnesium dicitrate, magnesium sulfate heptahydrate, and mixtures thereof; and wherein the concentrate composition is free of visible black particles and metal oxides after 3 months.

25. The method of claim 24, wherein the concentrate composition further comprises an additional material selected from the group consisting of a surfactant, a chelating agent, a thickening agent, a gelling agent, a foaming agent, a sequestering agent, and mixtures thereof.

26. The method of claim 24, wherein the concentrate composition has a viscosity of less than 100 cps, using a Brookfield viscometer, with spindle 1, at 200 rpm, at 20° C.

27. The method of claim 24, wherein when the magnesium salt is magnesium chloride hexahydrate, the composition is free of precipitates after 3 months.

28. The method of claim 24, wherein the concentrate composition has a pH of 11 to 13.

29. The method of claim 24, further comprising diluting the concentrate composition to form a use solution.

30. The method of claim 29, wherein the use solution comprises about 0.1% to about 10% of the concentrate composition after dilution.

31. The method of claim 29, wherein the use solution is applied by spraying, wiping, misting, foaming, fogging, mopping, squirting, flooding, or as part of a clean-in-place program.

32. The method of claim 29, further comprising applying the use solution to a hard surface, a soft surface, or a liquid.

33. The method of claim 32, wherein the hard surface is selected from the group consisting of tanks, pipes, mixers, walls, ceilings, tables, countertops, floors, drains, knives, saws, instruments, tools, worktables, conveyor belts, trucks, tanker cars, train cars, clean-in-place equipment, animal stalls, animal crates, produce crates, displace cases, surfaces in grocery stores, surfaces in butcher shops, surfaces in childcare facilities, surfaces in long term care facilities, and combinations thereof.

34. The method of claim 32, wherein the soft surface is selected from the group consisting of textiles, laundry, upholstery, drapery, carpet, and combinations thereof.

35. The method of claim 32, wherein the liquid is selected from the group consisting of swimming pools, hot tubs, cooling tower water, drinking water, food and beverage processing water, and combinations thereof.

36. The method of claim 32, wherein the use solution contacts the hard surface, the soft surface, or the liquid for a period of time of 10 seconds to 30 minutes.

* * * * *